(12) United States Patent
Sehgal et al.

(10) Patent No.: US 11,202,122 B1
(45) Date of Patent: Dec. 14, 2021

(54) STALE VARIANT HANDLING FOR ADAPTIVE MEDIA PLAYER

(71) Applicant: Sling Media Pvt. Ltd., Bangalore (IN)

(72) Inventors: Sagar Sehgal, Bangalore (IN); Purushotham Jinka, Bangalore (IN)

(73) Assignee: Sling Media Pvt. Ltd., Bangalore (IN)

( * ) Notice: Subject to any disclaimer, the term of this patent is extended or adjusted under 35 U.S.C. 154(b) by 0 days.

(21) Appl. No.: 17/162,732

(22) Filed: Jan. 29, 2021

(30) Foreign Application Priority Data

Nov. 17, 2020 (IN) .............................. 202041049964

(51) Int. Cl.
*H04N 21/4425* (2011.01)
*H04N 21/437* (2011.01)
*H04N 21/44* (2011.01)
*H04N 21/2187* (2011.01)

(52) U.S. Cl.
CPC ..... *H04N 21/4425* (2013.01); *H04N 21/2187* (2013.01); *H04N 21/437* (2013.01); *H04N 21/44004* (2013.01)

(58) Field of Classification Search
CPC ........... H04N 21/4425; H04N 21/2187; H04N 21/437; H04N 21/44004
See application file for complete search history.

(56) References Cited

U.S. PATENT DOCUMENTS

| | | | | |
|---|---|---|---|---|
| 10,911,508 B2* | 2/2021 | Jones | ................. | H04L 65/4092 |
| 2014/0143590 A1* | 5/2014 | Bagga | ................. | H04N 21/8456 714/4.11 |
| 2016/0127440 A1* | 5/2016 | Gordon | ............ | H04N 21/23439 709/219 |
| 2016/0248835 A1* | 8/2016 | Petrangeli | ............. | H04L 65/605 |
| 2017/0353516 A1* | 12/2017 | Gordon | ................... | H04L 67/10 |
| 2018/0191801 A1* | 7/2018 | Chen | ...................... | H04L 65/602 |
| 2019/0036986 A1* | 1/2019 | Sathyanarayana | .......................... | H04L 65/1083 |
| 2019/0222622 A1* | 7/2019 | Jones | .................. | H04L 65/1059 |
| 2019/0222879 A1* | 7/2019 | Jones | ............... | H04N 21/64322 |
| 2019/0342356 A1* | 11/2019 | Thomas | ......... | H04N 21/234309 |

OTHER PUBLICATIONS

R. Pantos, "HTTP Live Streaming draft-pantos-http-live-streaming-23," Apple Inc., Major League Baseball Advanced Media, dated May 22, 2017, 58 pages.

(Continued)

*Primary Examiner* — Yassin Alata
(74) *Attorney, Agent, or Firm* — Kilpatrick Townsend & Stockton LLP

(57) ABSTRACT

Techniques are described for handling stale variant cases that arise in adaptive streaming of content by media players. For example, embodiments include a delegate subsystem integrated with a media player client. The delegate subsystem can act as a proxy for requesting variant manifest update requests on behalf of the media player client and for receiving corresponding responses. The delegate subsystem can track the received update responses to determine whether the responses indicate a stale variant condition. If so, the delegate subsystem can issue a failover trigger to the media player client, such as by returning an error code, a variant gap tag, or the like. The failover trigger can cause the media player client 110 automatically to respond by executing a failover routine.

20 Claims, 7 Drawing Sheets

(56) References Cited

OTHER PUBLICATIONS

Apple Developer Documentation, "AVPlayer, An object that provides the interface to control the player's transport behavior," dated 2021, 8 pages.
Apple Developer Documentation, "AVAssetResourceLoaderDelegate," dated 2021, 2 pages.

* cited by examiner

STALE VARIANT HANDLING FOR ADAPTIVE MEDIA PLAYER

CROSS-REFERENCE TO RELATED APPLICATIONS

This application claims priority to Indian Provisional Application No. 202041049964, filed on Nov. 17, 2020, entitled "Stale Variant Handling For Adaptive Media Player," the disclosure of which is hereby incorporated by reference in its entirety for all purposes.

FIELD

This disclosure relates generally to adaptive media streaming and playback, and, more particularly, of stale variant handling during adaptive streaming of audiovisual media over a network to a media player.

BACKGROUND

Over recent years, there has been a massive proliferation of network-connected media player devices. Such devices can be used by consumers to download and/or stream audiovisual media from content sources via networks, such as to consume movies, television programs, user-generate video content, and the like. Streaming of audiovisual media over networks accounts for a significant portion of the traffic on those networks and a correspondingly significant portion of the network bandwidth and other resources. Various protocols have been developed to help maximize streaming media consumption experiences for end users within the resource limitations of networks.

One popular streaming media protocol is the HTTP Live Streaming (HLS) protocol developed by Apple Inc. The HLS protocol seeks to dynamically adapt the bitrate of streaming media content in response to changes in network link conditions. For example, the bitrate sent over a network link can be automatically reduced in response to detecting a degradation in link quality in order to maintain a continuous stream to the end user. In the HLS protocol, such adaptive bitrate streaming can be implemented by providing variant manifests for different bitrates. For example, each variant manifest is similar to a playlist indicating the segments of the streaming media to be downloaded, buffered, and played. A client media player can use the variant manifests to effectively maintain a forward buffer for a requested content stream, thereby maintaining a continuous playback stream for the end user.

In some cases, there may be a problem with the current playing variant (bitrate), such as where a pipeline error causes a particular segment of the variant to be temporarily unavailable when requested by the client media player. According to the streaming protocol, the client media player should be informed of the problem by some backend node, which should trigger the client media player to switch to a different variant or network source for the variant, or otherwise perform a failover routine. However, cases can arise in which the backend node does not detect the variant problem and, thus, does not notify the client media player. In such cases, the client media player may enter a stall state and fail to maintain a continuous playback stream.

SUMMARY

Among other things, embodiments provide novel systems and methods for handling stale variant cases that arise in adaptive streaming of content by media players. For example, embodiments include a delegate subsystem integrated with a media player client. The delegate subsystem can act as a proxy for requesting variant manifest update requests on behalf of the media player client and for receiving corresponding responses. The delegate subsystem can track the received update responses to determine whether the responses indicate a stale variant condition. If so, the delegate subsystem can issue a failover trigger to the media player client, such as by returning an error code, a variant gap tag, or the like. The failover trigger can cause the media player client 110 automatically to respond by executing a failover routine.

According to one set of embodiments, an adaptive media player system is provided. The system includes: a network interface to communicatively couple with one or more remote content delivery nodes (CDNs) via one or more access networks; a media player client subsystem configured for bitrate-adaptive streaming of a live content stream according to a streaming protocol that directs the bitrate-adaptive streaming using one or more manifests; and a delegate subsystem configured to mediate a sequence of manifest update requests issued by the media player client, the sequence of manifest update requests being for sequential updates to a requested variant manifest of the one or more manifests that is presently directing sequential buffering of content segments of the live content stream to effect the bitrate-adaptive streaming. The delegate subsystem includes: a delegate proxy to intercept a manifest update request of the sequence of manifest update requests, communicate the manifest update request to a CDN of the one or more remote CDNs via the network interface, and receive a manifest update response from the CDN via the network interface in response to the manifest update request, the manifest update response comprising a presumptively updated version of the requested variant manifest; and a stale variant detector to detect a stale variant state by determining that the presumptively updated version of the requested variant manifest matches a previously received version of the requested variant manifest, and issue a failover trigger to the media player client in response to detecting the stale variant state, wherein the media player client is further configured automatically to execute a failover routine in response to the failover trigger.

According to another set of embodiments, a method is provided for adaptive media playback of a live content stream. The method includes: mediating adaptive streaming of a live content stream to a media player client by a delegate subsystem running on top of the media player client, the mediating comprising, for a manifest update request of a sequence of manifest update requests issued by the media player client: intercepting the manifest update request by the delegate subsystem; communicating the manifest update request by the delegate subsystem to a remote content delivery node via a communication network, the manifest update request being for an update to a requested variant manifest that is presently directing sequential buffering of content segments of the live content stream; receiving a manifest update response by the delegate subsystem from the remote content delivery node via the communication network in response to the manifest update request, the manifest update response comprising a presumptively updated version of the requested variant manifest; detecting, by the delegate subsystem, a stale variant state by determining that the presumptively updated version of the requested variant manifest matches a previously received version of the requested variant manifest; and issuing a failover trigger by the delegate subsystem to the media player client in response to detecting the stale variant state, the media player client configured automatically to execute a failover routine in response to the failover trigger.

According to another set of embodiments, a system is provided for adaptive media playback of a live content stream. The system includes: one or more processors; and non-transient memory having instructions stored thereon, which, when executed, cause the one or more processors to mediate adaptive streaming of a live content stream to a media player client. The mediating includes, for a manifest update request of a sequence of manifest update requests issued by the media player client: intercepting the manifest update request by the delegate subsystem; communicating the manifest update request by the delegate subsystem to a remote content delivery node via a communication network, the manifest update request being for an update to a requested variant manifest that is presently directing sequential buffering of content segments of the live content stream; receiving a manifest update response by the delegate subsystem from the remote content delivery node via the communication network in response to the manifest update request, the manifest update response comprising a presumptively updated version of the requested variant manifest; detecting, by the delegate subsystem, a stale variant state by determining that the presumptively updated version of the requested variant manifest matches a previously received version of the requested variant manifest; and issuing a failover trigger by the delegate subsystem to the media player client in response to detecting the stale variant state, the media player client configured automatically to execute a failover routine in response to the failover trigger.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
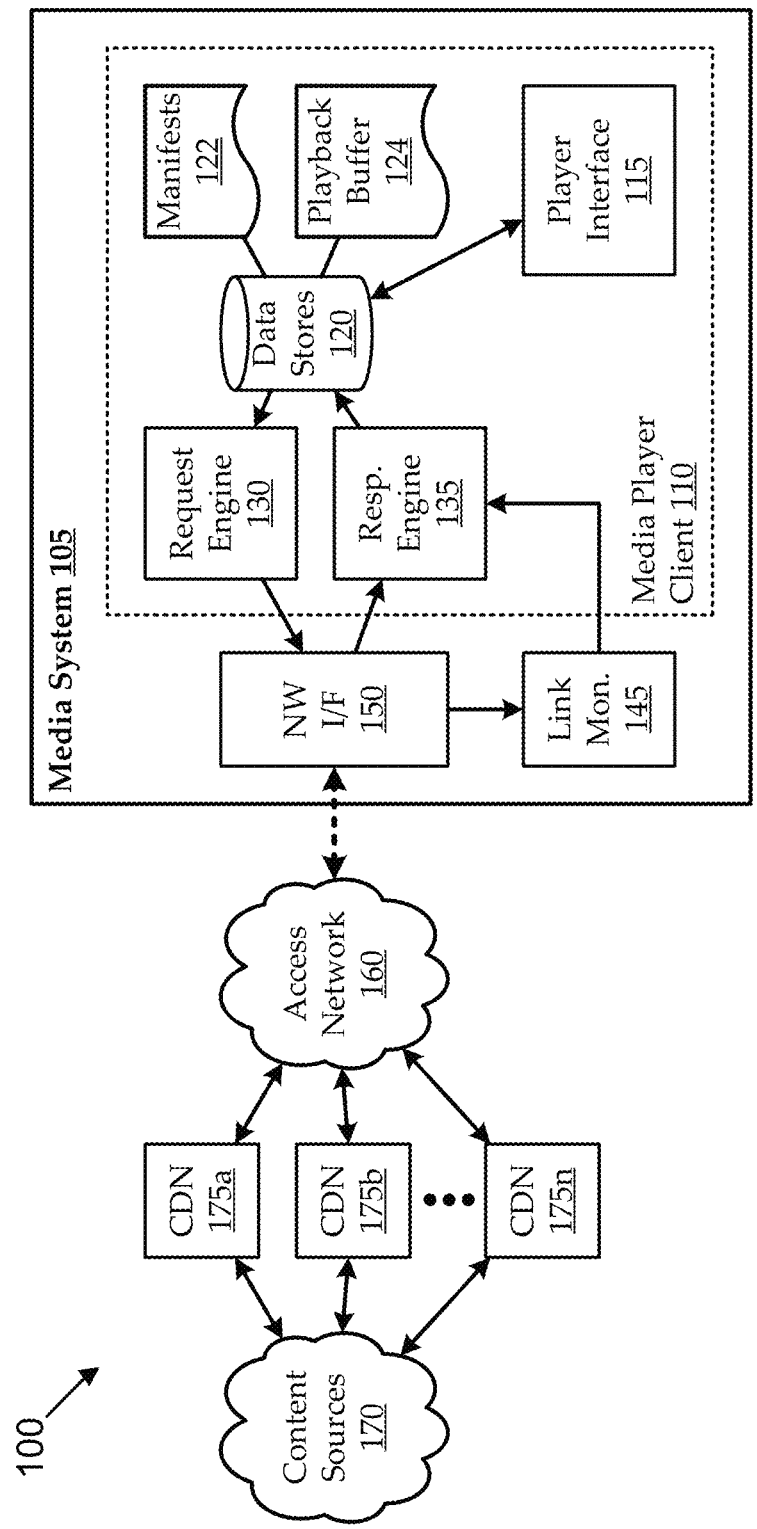
FIG. 1 shows a conventional network environment as a context for descriptions herein.

Turning to FIG. 1, a conventional network environment 100 is shown as a context for descriptions herein. The network environment 100 includes a media system 105 in communications with one or more remote content sources 170 from which it can receive streaming media, including live content streams. The media system 105 can be implemented by any suitable computational environment, such as any suitable consumer premises-type of device, such as a network-connected television, set-top box, desktop computer, smart home appliance, etc.; and/or any suitable consumer mobile-type of device, such as a smartphone, laptop or tablet computer, wearable device, e-reader, portable media player, etc. Such media systems can typically access remote content sources 170 via one or more access networks 160.

Many network architectures use content delivery networks (CDNs) 175, sometimes alternatively referred to as content distribution networks, to improve consumer quality of experience relating to online media consumption. CDNs 175 typically include servers that are strategically configured and located to improve content delivery to end consumers. For example, content sources 170 can be distributed across many public and private networks with different geographies, access rates, link qualities, capabilities, etc. However, CDNs 175 can be located (e.g., at Internet exchange points) for efficient access to access networks 160, and the CDN 175 servers can be configured for fast, efficient, secure throughput, caching, load balancing, redundancy, media request handling, and/or other features. As such, it is typical in modern network architectures for requested media content to be moved from remote content sources 170 to CDNs 175, and for content streaming transactions with media systems 105 to be handled via the CDNs 175, accordingly.

Even using CDNs 175, streaming of media content appreciably burdens networks. For example, streaming of audio-visual media over networks accounts for a significant portion of the traffic on those networks and a correspondingly significant portion of the network bandwidth and other resources. Various protocols have been developed to help maximize streaming media consumption experiences for end users within the resource limitations of networks. Some popular streaming media protocols are the HTTP Live Streaming (HLS) protocol developed by Apple Inc., and the Dynamic Adaptive Streaming over HTTP (DASH) protocol (or MPEG-DASH). These protocols generally seek to dynamically adapt the streaming media content in response to changes in network link conditions. Such adaptation can rely on one or more media coding (i.e., encoding and decoding) protocols, such as advanced video coding technologies developed by the International Telecommunications Union, the International Organization for Standardization/International Electrotechnical Commission Moving Picture Experts Group, and/or others (e.g., the so-called H.264, or MPEG-4 Part 10 Advanced Video Coding (AVC), codec; the H.265, or High Efficiency Video Coding (HEVC), codec; etc.). These media coding technologies can enable encoding of same audiovisual media content at different levels of compression, different bitrates, different numbers and/or types of layers, and/or the like. HLS, and/or other streaming protocols, can exploit these differently encoded versions of a same segment of media content to balance consumer experience against network resource consumption. For example, in response to detecting a degradation in link quality for a consumer while streaming media, the streaming protocol can automatically switch to a lower-quality-encoded version of the same media, which can be provided at a lower bitrate within the reduced link quality. As such, continuous streaming of the media to the consumer can be maintained even with the reduction in link quality, by reducing the need for network resources. The term "adaptive" (including in other forms), as used in context of streaming, media players, bitrate, and the like, is intended herein to broadly include any suitable type of adaptation of streaming content that is responsive to changes in link conditions, as supported by any suitable content streaming protocol. For example, an adaptive media player can refer to a media player configured to operate according to the HLS protocol to support AVC and/or HEVC bitrate adaptation of streaming content.

According to the HLS protocol, such adaptive streaming can be directed, at least in part, by manifests 122. The manifests 122 can include a master manifest and variant manifests. For a particular requested content stream, the master manifest can identify various sub-streams associated with the requested content stream, such as sub-stream information for accessing closed-caption streams, audio streams, video streams, etc. For example, when playing a particular content segment, the media player client 110 may synchronously play a particular audio content and a corresponding particular video segment from one of the variant manifests. Among the various sub-streams, the master manifest can identify multiple variant manifests. Each variant manifest can be associated with an encoded version of segments of the requested content stream. For example, each variant manifest can correspond to a version of video segments of the requested content stream encoded using a particular codec at a particular bitrate and/or resolution, associated with a particular audio and/or closed-caption sub-stream, etc. An example of a partial master manifest is as follows:

EXTM3U
EXT-X-VERSION:7
EXT-X-INDEPENDENT-SEGMENTS
EXT-X-SES SION-KEY:METHOD=SAMPLE-AES, KEYFORMAT="com.apple.streamingkeydelivery", KEYFORMATVERSIONS="1",
URI="skd://p-drmfp.movetv.com/fairplay/b5634421a1344c0781"
EXT-X-MEDIA: TYPE=CLOSED-CAPTIONS, GROUP-ID="cc", NAME="CC1", LANGUAGE="en", AUTOSELECT=YES, DEFAULT=YES, INSTREAM-ID="CC1"
EXT-X-MEDIA: TYPE=CLOSED-CAPTIONS, GROUP-ID="cc", NAME="SERVICE1", LANGUAGE="en", INSTREAM-ID="SERVICE1"
EXT-X-MEDIA: TYPE=AUDIO, GROUP-ID="aac_2_192", NAME="English", LANGUAGE="en", CHANNELS="2", AUTOSELECT=YES, DEFAULT=YES, URI="sample/audio_7_02_3_fairplay.m3u8"
EXT-X-MEDIA: TYPE=AUDIO, GROUP-ID="aac_2_160", NAME="English", LANGUAGE="en", CHANNELS="2", AUTOSELECT=YES, DEFAULT=YES, URI="sample/audio_7_01_3_fairplay.m3u8"
EXT-X-MEDIA: TYPE=AUDIO, GROUP-ID="aac_2_128", NAME="English", LANGUAGE="en", CHANNELS="2", AUTOSELECT=YES, DEFAULT=YES, URI="sample/audio_7_00_3_fairplay.m3u8"
EXT-X-STREAM-INF: BANDWIDTH=621772, AVERAGE-BANDWIDTH=516096, RESOLUTION=512×288, FRAME-RATE=29.970, CODECS="avc1.4d401f, mp4a.40.2", CLOSED-CAPTIONS="cc", AUDIO="aac_2_192"
sample/video_7_00_3_fairplay.m3u8
EXT-X-STREAM-INF: BANDWIDTH=1221427, AVERAGE-BANDWIDTH=1015808, RESOLUTION=768×432, FRAME-RATE=29.970, CODECS="avc1.4d401f,mp4a.40.2", CLOSED-CAPTIONS="cc", AUDIO="aac_2_192"
sample/video_7_01_3_fairplay.m3u8
EXT-X-STREAM-INF: BANDWIDTH=5399347, AVERAGE-BANDWIDTH=4497408, RESOLUTION=1280×720, FRAME-RATE=29.970, CODECS="avc1.640028, mp4a.40.2", CLOSED-CAPTIONS="cc", AUDIO="aac_2_192"
sample/video_7_04_3_fairplay.m3u8
EXT-X-STREAM-INF: BANDWIDTH=6013747, AVERAGE-BANDWIDTH=5009408, RESOLUTION=1280×720, FRAME-RATE=59.940, CODECS="avc1.640028, mp4a.40.2", CLOSED-CAPTIONS="cc", AUDIO="aac_2_192"
sample/video 7_05_3_fairplay.m3u8
EXT-X-I-FRAME-STREAM-INF: BANDWIDTH=95828, RESOLUTION=512×288, CODECS="avc1.4d401f", URI="iframe_00.m3u8"

The example master manifest identifies a number of variant manifests over a large range of encoding qualities. For example, a lower-quality variant manifest identified by "sample/video_7_00_3_fairplay.m3u8" is associated with an encoding bandwidth of around 600 kilobits per second (kbps) and a frame rate of around 30 frames per second (fps), while a higher-quality variant manifest identified by "sample/video_7_05_3_fairplay.m3u8" is associated with an encoding bandwidth of around 6 Gigabits per second (Gbps) and a frame rate of around 60 fps. Each variant manifest can be similar to a playlist indicating the segments of the streaming media to be downloaded, buffered, and played in accordance with that variant (e.g., for streaming at the variant's associated bandwidth, resolution, etc.). For example, in the HLS protocol, each variant manifest can be of the ".m3u8" filetype and can be populated by identifiers for ".ts" content segment locations (from which to retrieve a corresponding content segment). An example of a partial variant manifest is as follows:

EXTM3U
EXT-X-TARGETDURATION:2
EXT-X-PLAYLIST-TYPE: EVENT

EXT-X-START: TIME-OFFSET=1.999, PRECISE= YES
EXT-X-PROGRAM-DATE-TIME:2020-01-01T05:59: 58.001Z
EXT-X-KEY:METHOD=SAMPLE-AES, KEYFORMAT="com.apple.streamingkeydelivery", KEYFORMATVERSIONS="1", URI="skd://p-drmfp.movetv.com/fairplay/ e6f384ec27fa49da82"
EXTINF:2.048, /15804/live/DIYHD/2cdc287e8eb211-ea9f/sample/v0000008D73.ts
EXTINF:2.048, /15804/live/DIYHD/2cdc287e8eb211-ea9f/sample/v0000008D74.ts
EXTINF:2.048, /15804/live/DIYHD/2cdc287e8eb211-ea9f/sample/v0000008D75.ts
EXTINF:2.048, /15804/live/DIYHD/2cdc287e8eb211-ea9f/sample/v0000008D76.ts
EXTINF:2.048, /15804/live/DIYHD/2cdc287e8eb211-ea9f/sample/v0000008D77.ts
EXTINF:2.048, /15804/live/DIYHD/2cdc287e8eb211-ea9f/sample/v0000008D78.ts
EXTINF:2.048, /15804/live/DIYHD/2cdc287e8eb211-ea9f/sample/v0000008D79.ts
EXTINF:2.048, /15804/live/DIYHD/2cdc287e8eb211-ea9f/sample/v0000008D7A.ts
EXT-X-ENDLIST The example variant manifest indicates various characteristics of the requested content stream that is currently being streamed using the variant manifest. One characteristic is that the stream is being received as a sequence of content segments that are each approximately two seconds long (i.e., 2.048 seconds). For example, the media player client 110 includes a playback buffer 124 to which segments are buffered, and from which segments are retrieved, for playback. To support continuously streaming playback, the playback buffer 124 can seek to maintain a certain amount of forward-buffered content. In some implementations, the size of the forward buffer is approximately 1.5-times the length of each content segment. For example, suppose the media player client 110 begins by retrieving three segments: TS1, TS2, and TS3; each representing two sequential seconds of content. When the media player client 110 is approximately half way through playing the TS2 segment, it may request an update to the variant manifest, resulting in retrieving a next segment, TS4. Notably, this can typically be implemented as a pull mechanism; the media player client 110 detects its own link condition and requests an appropriate variant manifest update, accordingly.

Another characteristics illustrated by the example manifest is that the requested content stream has a particular stream type. In the example manifest, the stream type is identified as an "EVENT" stream type ("#EXT-X-PLAYLIST-TYPE: EVENT"). The streaming protocol may support various stream types, such as "on-demand" streams, "live" streams, and "event" streams. On-demand-type streams can represent streams for content that is fully available (i.e., previously recorded), such that all past, present, and future segments of the content can be cached by the CDNs 175, or in any suitable location. For example, in the HLS protocol, such a stream type can be identified by "#EXT-X-PLAYLIST-TYPE: VOD" ("VOD" indicating "video on demand"). When streaming such on-demand content, the variant manifest may be populated from the start with all the content segment identifiers, or with a relatively large number of content segment identifiers. For example, the variant manifest may be retrieved as a static file manifest (e.g., beginning with an identifier of the first content segment, and ending with a "#EXT-X-ENDLIST" tag to indicate the end of the content), and no variant manifest updates are requested or received during streaming. In some implementations, this can permit a user of the media player client 110 to fully navigate (e.g., play, pause, fast-forward, rewind, etc.) over the entire content.

Live-type streams can represent streams for content that is being streamed in-time with its creation. For example, such content can include a live broadcast of never-recorded content, a re-broadcast of or including previously recorded content, etc. For live content streams, the variant manifest is continually updated during streaming by removing past content segment identifiers from the variant manifest as new content segments are created and are made available (e.g., via a CDN 175, or other location). For example, when streaming such live content, the variant manifest may be populated with a moving window of content segment identifiers. Typically, such a live content stream does not support navigation by a user of the media player client 110, or navigation support is very limited. For example, a consumer watches such a live stream only at the so-called "live edge" of the content.

Event-type streams can represent streams that include content that is being generated at the time of the streaming (e.g., similar to live-type streams), but for which backward-looking information is retained to support navigation (e.g., similar to on-demand-type streams). For example, such content can include a live broadcast of an event, to which a consumer may tune in during the event (or at the beginning of the event), and for which the consumer may desire to be able to pause, rewind, and/or otherwise navigate the content for the event. For such event streams, the variant manifest is continually updated during streaming by appending new content segment identifiers to the variant manifest as new content segments are created and are made available (e.g., via a CDN 175, or other location), but past content segment identifiers are not removed from the variant manifest. Typically, such a live content stream supports navigation by a user of the media player client 110 to any point in the content preceding and up to the live edge, but not beyond (i.e., no content is available for navigation past the live edge). Only upon completion of creation of the event content, the variant manifest will be updated to indicate that the end of the content has been reached (e.g., by appending a "#EXT-X-ENDLIST" tag, as illustrated in the example manifest).

As illustrated in FIG. 1, embodiments of the media system 105 include the media player client 110 and a network interface 150. The network interface 150 includes any suitable components to facilitate network connectivity and communications via the one or more access networks 160 for the media player client 110. For example, the network interface 150 can include antennas, physical and/or logical ports, communication chipsets, amplifiers, filters, etc. The media player client 110 can include any suitable components to facilitate at least adaptive streaming of audiovisual media via the access networks 160. In the illustrated implementation, the media player client 110 includes a player interface 115, one or more data stores 120, a request engine 130, and a response engine 135.

Figure 2:
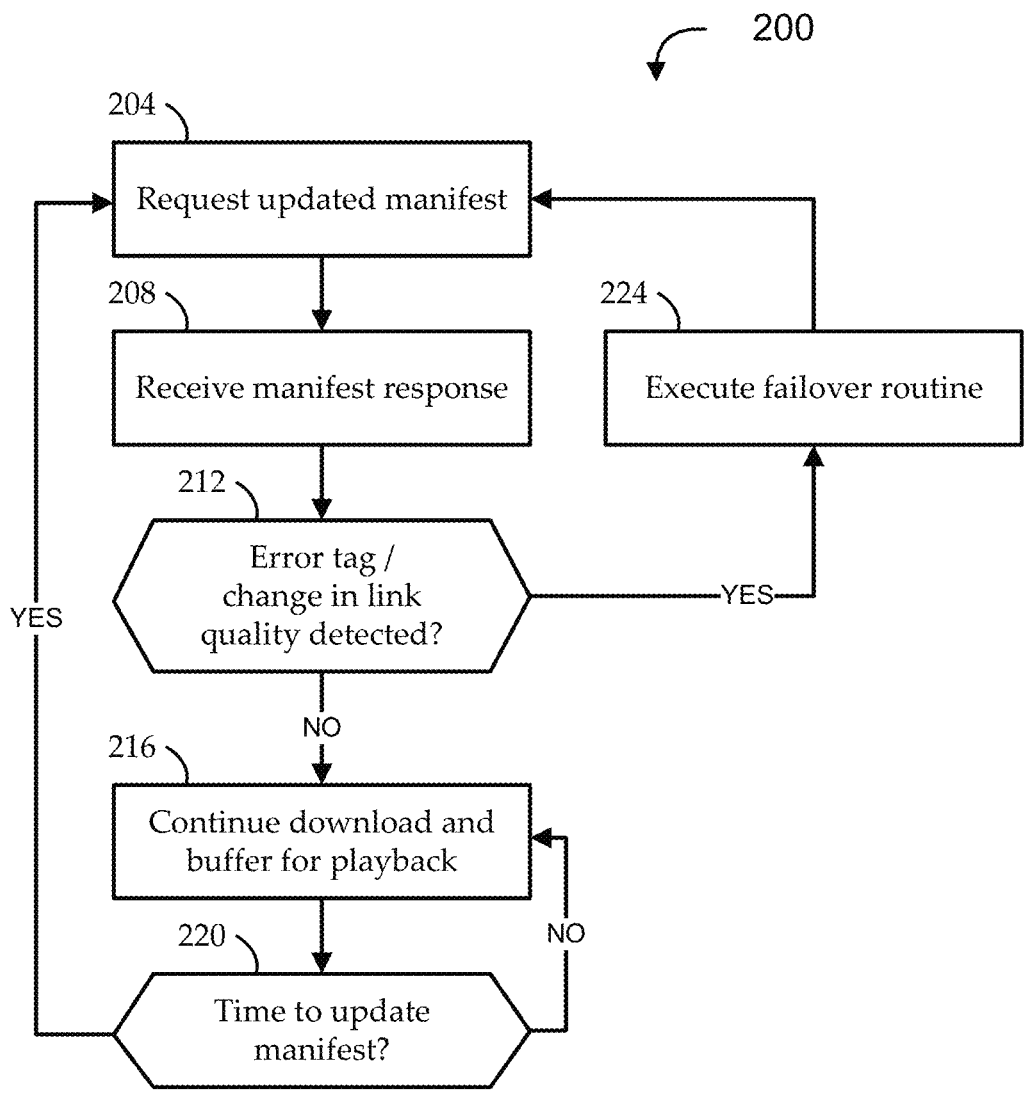
FIG. 2 shows a flow diagram of an illustrative live media streaming transaction method, according to a conventional implementation.

FIG. 2 shows a flow diagram of an illustrative live media streaming transaction method 200, according to a conventional implementation. The conventional method 200 can be implemented in context of the conventional media system 105 of FIG. 1. A consumer (e.g., a human user) accesses features of the media player client 110 via the player interface 115 to request particular live media content for streaming from some network location. The term "live" is used herein to generally include any type of stream for which streaming involves iteratively requesting and receiving manifest updates (e.g., including both live-type and event-type streams described above). Though the above description differentiates between live-type and event-type streams in certain ways, streaming of both live-type and event-type streams involves retrieving content segments while new content segments are still being created and made available). For example, content segment identifiers (e.g., logical addressed at which to receive ".ts" segment files) are iteratively and sequentially appended to the variant manifest an "ENDLIST" tag is ultimately retrieved to indicate the end of the content.

In response to the consumer's request, the media player client 110 various manifests 122 are received and stored to the data stores 120, and the manifests 122 essentially provide playlists and other information from which the media player client 110 can determine available of variant stream options, sequences of content segments to retrieve, and/or other information relevant to the streaming. To execute the streaming, the media player client 110 can sequentially request (e.g., via the request engine 130), retrieve (e.g., via the response engine 135), and buffer (e.g., to a playback buffer 124 at the data stores 120) content segments of the requested media content. The buffering can be performed in a manner that maintains forward-data, so that a continuous stream can be maintained even with temporary fluctuations in connectivity, link quality, etc.

According to a typical media streaming protocol (e.g., HLS), a cycle of request, retrieve, buffer, and playback is performed by the media player client 110 in accordance with the one or more manifests 122. For example, as illustrated, at stage 204 the media player client 110 can request an update to a manifest 122 from a CDN 175. The update can be received at the media player client 110 from the CDN 175 at stage 208. The update can indicate what is presently available in the cache of the CDN 175 for the requested stream associated with the manifest. Assuming the update is successful, at stage 216, the media player client 110 can use the updated manifest to request and retrieve one or more next content segments from the cache of the CDN 175. The retrieved content segments can be played back sequentially by the media player client 110. At stage 220, the media player client 110 can monitor whether it is time for another update to the manifest. For example, the media player client 110 seeks to maintain at least a minimum amount of forward-buffered content, and the media player client 110 requests an update to the manifest in response to detecting that the size of the forward buffer is approaching its minimum. If it is not time for an update, retrieval and/or playback of content segments can continue at stage 216. If it is time for an update to the manifest, the method can return to stage 204 for another manifest update request.

The above assumed that the update at stage 208 was successful. However, practically, the media player client 110 can encounter situations where the update at stage 208 is unsuccessful (a "failover condition"). For example, upon receipt of the update, the media player client 110 can determine, at stage 212, whether the response includes or indicates an error tag, a change in link condition, or some other unsuccessful condition. In such cases, the media player client 110 can be configured to support various types of automatic failover responses. One type of unsuccessful condition involves a change in link quality. As illustrated, some media systems 105 (or media player clients 110) include a link monitor 145 to detect such changes in link quality. For example, the link monitor 145 can detect network events, such as network speed, packet errors, and/or the like, that signal changes in available bandwidth, supported bitrate, etc. In such cases, the failover engine 140 of the media player client 110 can be implemented automatically to perform a failover routine. For example, in response to detecting a reduction in link quality during streaming of content from a CDN 175, the media player client 110 can respond, according to a streaming protocol (e.g., according to information stored in one of the manifests 122, or in another location), to switch to a lower-quality stream (i.e., a variant stream) of the same content. Another type of condition that may be detected by the media player client 110 is an error in the stream being downloaded. For example, in response to requesting an update to the stream, the media player client 110 may receive an indication that a particular content segment is unavailable, and may be forced to find another source for the content segment, or switch to a different variant of the stream.

In response to the above or other conditions indicating an unsuccessful manifest update, the method 200 can execute a failover routine at stage 224. Such a failover routine can involve switching to a different source and/or variant can involve the media player client 110 requesting a different variant stream from the same CDN 175, requesting a different variant stream from a different CDN 175, requesting the same variant stream from a different CDN 175, etc. Though described as an "unsuccessful" update and as a "failover" routine, some implementation can respond to detection at stage 212 of a positive condition, so long as it results in execution of a defined responsive routine. For example, it may be detected at stage 212 that link conditions have improved to a level to trigger a failover routine at stage 224 that switches to a higher-quality stream of the content.

Notably, media player clients 110, CDNs 175, content sources 170, and other parties can each have respective roles to play in a streaming transaction, and each may be optimized toward those respective roles. In particular, to support fast, efficient, and reliable streaming of media, it can be desirable to reduce processing, overhead, etc. of the media player clients 110 and CDNs 175 by avoiding burdening those parties with tasks that could be better handled by other parties. For example, media player clients 110 (and the streaming protocols they exploit) may be configured to efficiently request, retrieve, buffer, and playback content segments; but they may not be configured to track operation of the CDNs 175 and/or other backend components to detect encoding errors, pipeline concerns, etc. For example, typical streaming protocols tend to rely on backend systems to provide some sort of error notification to trigger the media player client 110 to execute a failover routine. However, the CDNs 175 may be configured to efficiently encode, cache, and deliver content segments; but they may not be configured to track individual update statuses for huge numbers of media player clients 110 that may be engaging with their cached content, issue individualized error codes to those media player clients 110, etc.

Such individuation of roles can result in certain situations in which a manifest update is unsuccessful for one or more media player clients 110, but the CDN 175 involved in the update is nevertheless unaware of the failure. In such situations, even though a failover condition arises, conventional media player clients 110 may similarly be unaware of the condition and may fail to execute a failover routine, accordingly. For example, suppose there is an error in the pipeline between the CDN 175 and one or more content sources 170, or an error in an encoder of the CDN 175. Either case can result in at least a temporary unavailability of a particular content segment (e.g., "TS4") for a requested variant of a content stream. From the perspective of the CDN 175, it may simply know that its cache includes TS1, TS2, and TS3. It may have no reason to expect TS4, to know that TS4 is unavailable, etc. When the media player client 110 requests a variant manifest update at stage 204 and receives the update response at stage 208, the update may appear to the CDN 175 to have been successful. For example, the update essentially asks the CDN 175 what is presently in its cache for the requested variant, and response correctly reflects what in presently in the CDN 175 cache; the CDN 175 has no reason to generate or communicate any error or other indication to the media player client 110 that TS4 is not available. Similarly, from the standpoint of the conventional media player client 110, an update was received without any error tags, packet error losses, or other indications of concern. Though no concern has been communicated or detected, the received variant manifest is not actually updated; it is "stale." The media player client 110 determines at stage 212 that there is no failover condition; continues to download, buffer, and playback at stage 216; and determines again at stage 220 that an update to the manifest is needed. Another request is issued again at stage 204, and the same (stale, not updated) variant is received again at stage 208 without any indication of error. The conventional media player client 110 may continue to iterate until the forward buffer shrinks to a level at which a continuous stream can no longer be maintained. Typically, this causes the conventional media player client 110 to enter a stall state. For example, in the stall state, the media player client 110 may display a buffer wheel or other graphical indication of buffering, a black screen, or some other indication that streaming playback has stalled.

Embodiments described herein include novel approaches to handling stale variant cases that arise in adaptive streaming of content by media players. For example, embodiments include a novel delegate subsystem 310 integrated with the media player client. The delegate subsystem 310 can act as a proxy for requesting variant manifest update requests on behalf of the media player client and for receiving corresponding responses. The delegate subsystem 310 can track the received update responses to determine whether the responses indicate a stale variant condition. If so, the delegate subsystem 310 can issue a failover trigger to the media player client, such as by returning an error code, a variant gap tag, or the like. The failover trigger can cause the media player client 110 automatically to respond by executing a failover routine.

Figure 3:
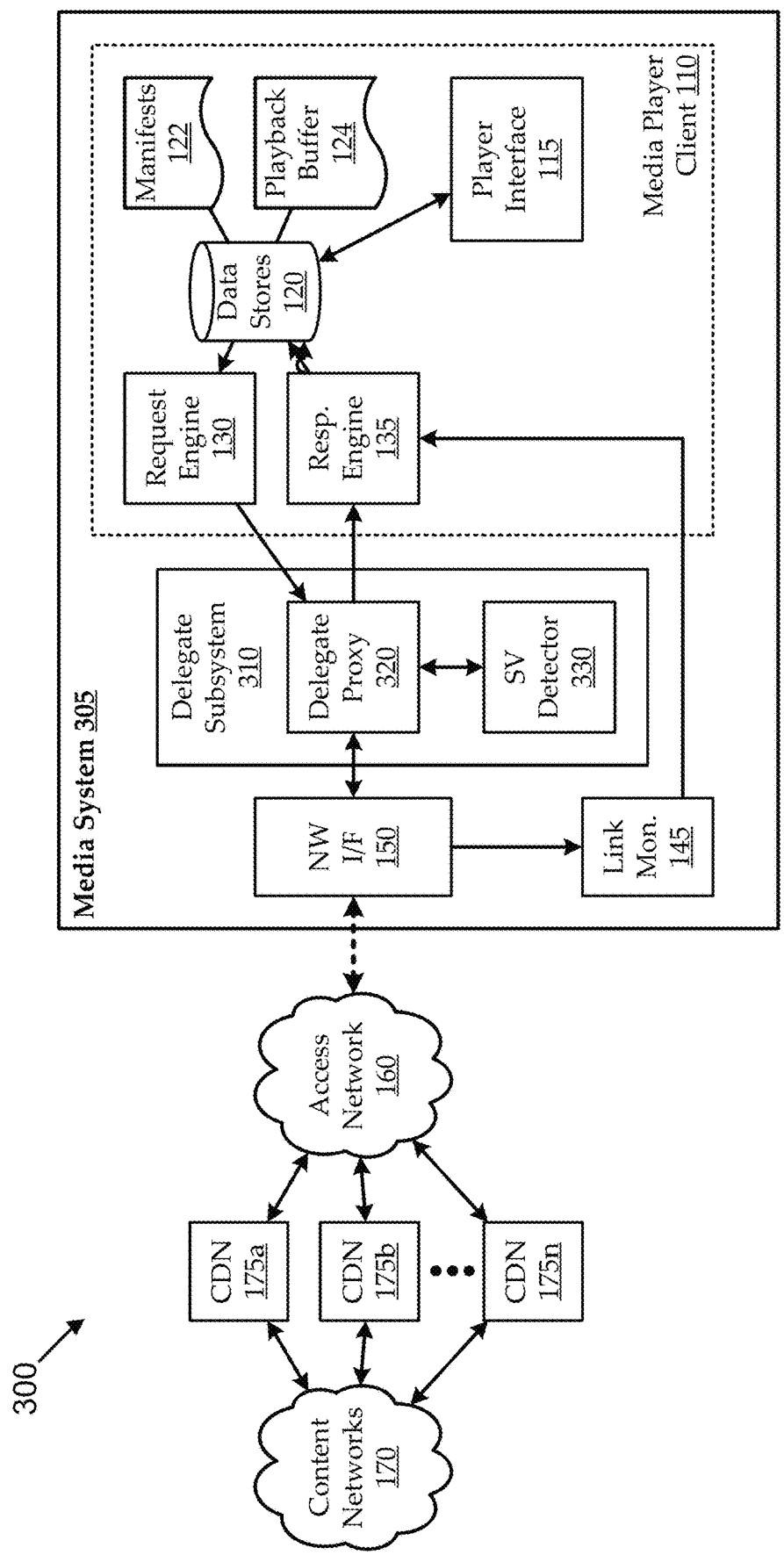
FIG. 3, a network environment is shown to include a novel media system, according to various embodiments described herein.

Turning to FIG. 3, a network environment 300 is shown to include a novel media system 305, according to various embodiments described herein. The network environment 300 includes the media system 305 in communications with one or more remote content sources 170 from which it can receive streaming media, including live content streams. The network environment 300 can generally be considered as having a provider side and a client side. The media system 305 may be one of many (e.g., possibly millions of) media systems 305 on the client side of the network, such as disposed at various consumer premises, being used as mobile consumer devices, etc. The provider side of the network can generally include all of the various systems, networks, nodes, and other entities providing streaming media and related services to the client-side systems. For example, as illustrated, the provider side of the network can include access networks 160, CDNs 175, and remote content sources 170.

The media systems 305 can include a network interface 150 to facilitate access to networks. For example, the media systems 305 typically use their respective network interfaces 150 to access remote content sources 170 via the one or more access networks 160. For example, the access networks 160 can include any type of wired or wireless network, or combination thereof, such as a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the access networks 160 include one or more network access points, such as wired or wireless network access points (e.g., base stations and/or internet exchange points). In some embodiments, one or more network nodes are disposed between the access networks 160 and the content sources 170, such as one or more CDNs 175. As described with reference to FIG. 1, network architectures can use CDNs 175 to provide various features relating to improving network resources management and improving consumer quality of experience during online streaming media consumption.

Some embodiments described herein operate in context of delivering streaming media content, including so-called "over-the-top" (OTT) content, to end consumers via a media player client 110 running on the media system 305. Such OTT content can include both on-demand and live (e.g., broadcast) content delivered from remote content sources 170 via the Internet and/or other networks. For example, the end consumer may use the media player client 110 to watch live television, movies, Internet video content, etc. The media system 305 can be implemented by any suitable computational environment, such as any suitable consumer premises-type of device, such as a network-connected television, set-top box, desktop computer, smart home appliance, etc.; and/or any suitable consumer mobile-type of device, such as a smartphone, laptop or tablet computer, wearable device, e-reader, portable media player, etc.

As described herein, the media system 305 can be configured for adaptive streaming in accordance with one or more adaptive streaming protocols, such as HLS. Such adaptive streaming can use adaptive encoding protocols, such as AVC or HEVC, to enable encoding of same audiovisual media content at different "quality" levels. Each quality level can be characterized by a particular set of encoding parameters, such as a target bandwidth, resolution, frame rate, etc., which can ultimately impact the amount of data involved in communicating data encoded according to those parameters. For example, it may consume more network resources (e.g., higher bandwidth, higher bitrate, etc.) to communicate a higher quality encoding of a particular content stream. Thus, a goal of an adaptive media system 305 is to monitor link conditions and to adjust the bit rate at which it is streaming content in response to detected changes in link conditions. For example, as the link conditions degrade, it may be desirable for the media system 305 to automatically begin requesting a lower quality stream as an attempt to maintain a continuous stream in spite of the degrading link quality.

Embodiments of the media player client 110 can include any suitable components to facilitate at least adaptive streaming of audiovisual media. For example, as described above, embodiments of the media player client 110 can include at least a player interface 115, one or more data stores 120, a request engine 130, and a response engine 135. As described above, adaptive streaming in accordance with HLS, or other similar protocols, can exploit manifests 122, which can be maintained locally by the media player client 110 in its data stores 120. The manifests 122 can include a master manifest and variant manifests. For a particular requested content stream, the master manifest can define high-level information usable by the media player client 110 for streaming of a requested content stream (e.g., information about the availability and location of closed-caption streams, audio streams, video streams, etc.), and each variant manifest can be similar to a playlist indicating content segments of the streaming media to be requested, downloaded, buffered, and played in accordance with a corresponding variant of the requested content stream (e.g., each of at least some of the variants corresponding to a respective encoding quality). Examples of master and variant manifests are provided above.

The components of the media player client 110 can be configured to stream requested media content by iteratively requesting, downloading, buffering, and playing back content segments of the requested media stream in accordance with requested stream variants. For example, during streaming, the media player client 110 uses its request engine 130 to request an update to a particular variant manifest (e.g., selected based on detection of current link conditions by a link monitor 145) from a particular CDN 175. The particular variant manifest and the particular CDN 175 may be identified by the master manifest. In response, the CDN 175 should return an update to the variant manifest, which can be received by the media player client 110 via the response engine 135. Assuming a successful update, the received updated variant manifest indicates identifiers for (e.g., logical addresses for) one or more next content segments in the sequence of segments to be downloaded to continue streaming of the requested content. The identified segments in the variant manifest can represent the present contents of a cache for that stream variant maintained at the CDN 175. When the media player client 110 determines it is time to update its local playback buffer 124 (e.g., when it has reached a threshold minimum distance from the end of the forward buffer), the media player client 110 can issue a request via its request engine 130 to the CDN 175 to download a next content segment identified in the variant manifest. In response, the media player client 110 should be directed by the CDN 175 to download the requested content segment via its response engine 135. The downloaded content segment is stored to the local playback buffer 124, and may ultimately be played back, in turn, via the player interface 115. For example, the player interface 115 outputs the content segment as a part of the content stream being displayed to a consumer via a display of the media system 305. In some cases, the consumer can interact with the displayed content stream via the player interface 115, for example, to navigate through portions of the content that have been received by the media player client 110.

As noted above, various situations can arise in which a manifest update is unsuccessful for one or more media player clients 110. Many such cases result in some indication of concern being received and/or detected by the media player client 110. For example, if the media player client 110 sends a request for a file to a CDN 175 or content source 170, and the requested file does not exist at the target location, the media player client 110 may receive a "file not found" error code. Similarly, the media player client 110 may detect if it completely loses network connectivity, or if it fails to receive any responses from a CDN 175 for some amount of time.

However, in some cases of unsuccessful manifest updates, conventional implementations tend not to include any mechanism for detecting or indicating concern. In particular, certain backend pipeline errors, CDN 175 encoder errors, and/or other provider-side errors can result in a failure to timely (and/or correctly) update CDN 175 caches, but may not be immediately detectable by either the CDN 175 or the media player client 110. As one example, a temporary encoder or pipeline condition can arise that causes a CDN 175 cache for a particular stream variant to update too slowly; such that a next segment of the content has been created by a content source 170 and has been requested by a media player client 110, but has not yet been encoded for that stream variant. As another example, one or more content segments has been removed from the CDN 175 cache for a particular stream variant. In such cases, a stale variant condition can tend to arise.

For the sake of illustration, at some time "X", a last segment index delivered as part of a variant manifest update response is "v0300005AEC.ts." For example, a last portion of the updated variant manifest is as follows:
  #EXT-X-KEY:METHOD=SAMPLE-AES,
    KEYFORMAT="com.apple.streamingkeydelivery",
    KEYFORMATVERSIONS="1",
    URI="skd://p-drmfp.movetv.com/fairplay/
      b029fbf3e939456"
  #EXTINF:2.048,
    /15807/live/CNNHD-DYN/4f0dd63277eb11eab/
      sample/v0300005AEB.ts
  #EXT-X-KEY:METHOD=SAMPLE-AES,
    KEYFORMAT="com.apple.streamingkeydelivery",
    KEYFORMATVERSIONS="1",
    URI="skd://p-drmfp.movetv.com/fairplay/
      b029fbf3e939456"
  #EXTINF:2.048,
    /15807/live/CNNHD-DYN/4f0dd63277eb11eab/
      sample/v0300005AEC.ts At a subsequent time of X+2.048 seconds (the content segments are indicated as being 2.048 seconds each), the media player client 110 expects more segments to be appended in a next variant manifest update response. However, due to some provider-side condition involving the CDN 175, the next variant manifest update response indicates the same last content segment ("v0300005AEC.ts"). This is a stale variant delivery. Conventionally, some media player clients 110 are configured to make up to three additional attempts (e.g., from X+2.048 seconds until X+(1.5×2.048) seconds) to fetch a properly updated variant manifest. By that time, the minimum forward buffer size may have been reached. For example, in response, the media player client 110 may blacklist that stream variant and/or that CDN 175 for some amount of time, which can result in intermittent buffering and/or a stall state.

As illustrated in FIG. 3, embodiments described herein include a delegate subsystem 310 that can seek to detect such stale variant cases. Upon detection, embodiments of the delegate subsystem 310 can force the media player client 110 to react, thereby avoiding interruptions to streaming playback of the content stream (e.g., due to intermittent buffering and/or stalling). Embodiments of the delegate subsystem 310 can be implemented as a mediator between the media player client 110 and the networks (e.g., via the network interface 150). The delegate subsystem 310 can be deployed separate from the media player client 110. For example, a first entity or entities can provide one or more different media player clients 110, a second entity or entities can provide one or more CDNs 175 and/or related services, and a third entity separate from the first and/or second entities can provide the delegate subsystem 310. In one embodiment, the media player client 110 includes a media player application, and the delegate subsystem 310 is implemented as a plugin to the media player application. In another embodiment, the delegate subsystem 310 is part of a set of wrapper components designed to add or modify various functionality of the media player client 110, such as to provide certain user interface elements, to handle subscriber authentication, to handle advertisements, etc. For example, the customer experience may be appreciably shaped and managed via the delegate subsystem 310 (and other related components), and the media player client 110 may be implemented as an embedded client within the delegate subsystem 310.

As illustrated, the delegate subsystem 310 can include a delegate proxy 320 and a stale variant detector 330. Embodiments of the delegate proxy 320 can be implemented as any suitable client-side proxy running in the media system 305 environment. For example, the delegate proxy 320 can operate as a local proxy server, or the like. Though illustrated as different components, the stale variant detector 330 can be implemented separately, as a component of the delegate proxy 320, or in any other suitable manner. In general, the delegate subsystem 310 can mediate a sequence of manifest update requests issued by the media player client to support adaptive streaming of requested media content (e.g., a live content stream). As described herein, the sequence of manifest update requests can be requests for sequential updates to a requested variant manifest of one or more manifests 122 that is presently directing sequential buffering of content segments of the live content stream.

In some embodiments, the mediation is put into effect by the delegate subsystem detecting that the media player client 110 has issued a request for a live content stream, and forcing delegation of resource loading associated with the content request to itself (i.e., to the delegate proxy). For example, where the delegate subsystem 310 is implemented separately from the media player client 110, there may be no practical way to change the code or operation of the media player client 110 itself. As such, the delegate subsystem 310 can be configured to exploit certain functions of the media player client 110 to force the resource delegation. Some implementations force delegation of resource loading from the media player client 110 to the delegate subsystem 310 by using an asset delegation function of the media player client 110, such as "AVAssetResourceLoaderDelegate," or the like. In some such implementations, the content request issued by the media player client 110 includes a logical address of the requested content (e.g., corresponding to an HTTP request for a particular uniform resource locator (URL), uniform resource identifier (URI), uniform resource name (URN), or the like). In such implementations, forcing delegation for the resource loading can involve parsing the content request to determine the network address for the live content stream identified by the content request, and modifying the network address to a custom address scheme to cause the media player client automatically to delegate resource loading to the delegate proxy for the content request. For example, the content request may include a URL beginning with "https://sampleurl . . . " and the delegate subsystem 310 may automatically replace the "http://" with a "fakehttp://" (e.g., resulting in a new URL, such as "fakehttps://sampleurl . . . "). Such an approach can effectively force the media player client 110 to delegate its resource loader (for streaming) to a custom conforming class (e.g., the delegate proxy 320), which can be defined and controlled within the delegate subsystem 310. For example, such delegation permits the delegate proxy 320 to handle streaming and buffering requests, such as manifest update requests.

With the resource loading delegated to the delegate proxy 320, the delegate proxy 320 can handle relevant requests and responses on behalf of the media player client 110 (i.e., the request engine 130 and the response engine 135). For example, for each manifest update request, the delegate proxy 320 can intercept the manifest update request and communicate the manifest update request to an indicated CDN 175 (e.g., via the network interface 150). The delegate proxy 320 can then receive a manifest update response from the CDN 175 (e.g., via the network interface 150) in response to the manifest update request.

Each received manifest update response includes a presumptively updated version of the requested variant manifest. The term "presumptively updated" is used to indicate that an update has been requested, and a response has been received without any indication from the CDN 175 of any concern or error; but the response may include a update to the requested variant manifest, or it may, in fact, be a stale variant response. Embodiments of the stale variant detector 330 can detect a stale variant state by determining whether the presumptively updated version of the requested variant manifest appears to be a valid update, or a stale variant. In some embodiments, the stale variant detector 330 keeps track of one or more previously received versions of one or more variant manifests. For example, the stale variant detector 330 may keep track of a last content segment identifier that was received in response to a manifest update request for a presently used variant. If the presumptively updated version of the requested variant manifest matches a previously received (tracked) version of the requested variant manifest, the stale variant detector 330 can determine that a stale variant has been received. In some implementations, a stale variant is determined to have been received only after further conditions are reached. In one implementation, a stale variant is determined to have been received only after the presumptively updated version of the requested variant manifest is determined to match multiple (e.g., two) previously received versions of the requested variant manifest. In another implementation, a stale variant is determined to have been received only if the presumptively updated version of the requested variant manifest is determined to match the previously received versions of the requested variant manifest and the forward-buffered content for the stream has fallen below a threshold amount. For example, the stale variant detector 330 may not be enabled, or may not detect a stale variant condition while there is still enough forward buffer to wait for provider-side remediation of any temporary condition causing the stale variant.

If no match is detected by the stale variant detector 330, embodiments of the stale variant detector 330 may determine that a valid update was received. In response to determining that a valid update was received (and/or that no stale variant condition is present), the response can be forwarded to the media player client 110 (e.g., by the delegate proxy 320 to the response engine 135). For example, assuming no stale variant condition exists, the delegate subsystem 310 may be substantially transparent to the normal streaming functionality of the media player client 110. From the perspective of the media player client 110, a request was made by its request engine 130 for a variant manifest update, and a response was received by its response engine 135 that includes an updated variant manifest, as requested. If the stale variant detector 330 does detect a stale variant condition, embodiments can issue a failover trigger. The failover trigger can be implemented in any suitable manner that causes the media player client automatically to execute a failover routine (e.g., defined by the streaming protocol and/or the master manifest) in response to the failover trigger. In one implementation, the failover trigger includes a Hypertext Transfer Protocol (HTTP) 404 error response code. In another implementation, the failover trigger includes a live streaming protocol gap tag, such as "#EXT-X-GAP" in the HLS protocol. For example, prior to forwarding the response from the delegate proxy 320 to the response engine 135, embodiments of the stale variant detector 330 can append the live streaming protocol gap tag to the end of the presumptively updated version of the variant manifest. Upon receiving the updated version of the variant manifest with the appended gap tag (e.g., or receiving the 404 error), the media player client 110 can immediately know that a failover condition has occurred, and it can take remedial action. For example, the media player client 110 can be configured automatically to execute a failover routine, such as by switching to requesting a different stream variant and/or switching to a different CDN 175.

Embodiments of the delegate subsystem 310 can be implemented in any suitable manner, including on one or more computational systems, as described below. For example, embodiments of components of the delegate subsystem 310 can be implemented using one or more central processing units CPUs, application-specific integrated circuits (ASICs), application-specific instruction-set processors (ASIPs), graphics processing units (GPUs), digital signal processors (DSPs), field-programmable gate arrays (FPGAs), programmable logic devices (PLDs), controllers, state machines, microcontroller units, reduced instruction set (RISC) processors, complex instruction set (CISC) processors, microprocessors, or the like, or any combination thereof. Embodiments of the delegate subsystem 310, or components thereof, can be implemented on, can be incorporate in, and/or can incorporate, one or more computer systems.

Figure 4:
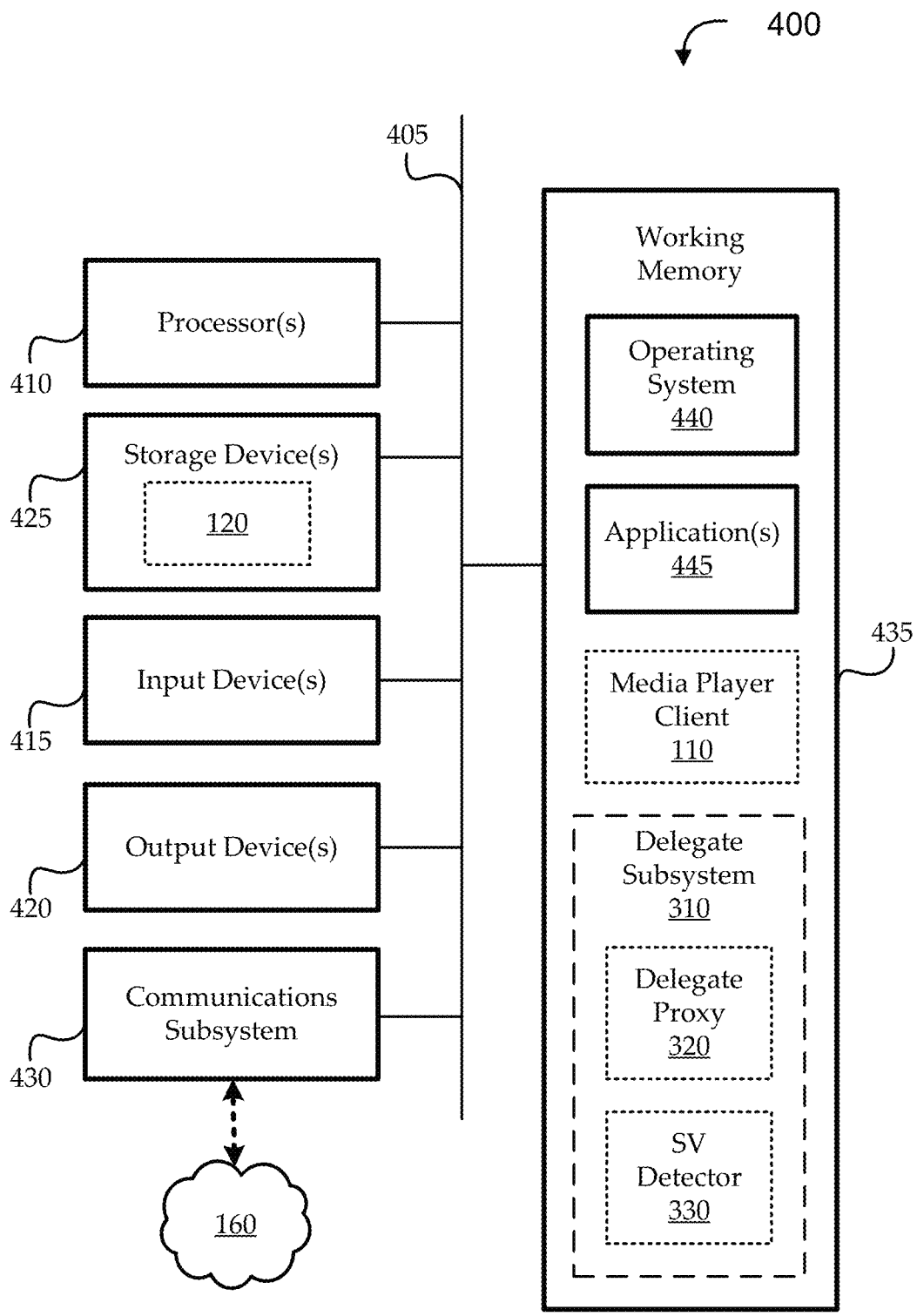
FIG. 4 provides a schematic illustration of one embodiment of a computer system that can implement various system components and/or perform various steps of methods provided by various embodiments.

For example, FIG. 4 provides a schematic illustration of one embodiment of a computer system 400 that can implement various system components and/or perform various steps of methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown including hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, video decoders, and/or the like); one or more input devices 415, which can include, without limitation, a mouse, a keyboard, remote control, touchscreen interfaces, audio interfaces, video interfaces, and/or the like; and one or more output devices 420, which can include, without limitation, display devices, printers, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 425 include the data stores 120. For example, the storage devices 425 can be used to store manifests 122, playback buffers 124, and/or information relating to adaptive streaming of media content.

The computer system 400 can also include a communications subsystem 430, which can include, without limitation, a modem, a network card (wireless or wired), an infrared communication device, a wireless communication device, and/or a chipset (such as a Bluetooth™ device, an 402.11 device, a WiFi device, a WiMax device, cellular communication device, etc.), and/or the like. As described herein, the communications subsystem 430 supports multiple communication technologies. Further, as described herein, the communications subsystem 430 can provide communications with one or more access networks 160, and/or other networks. Though not explicitly illustrated, embodiments of the communications subsystem 430 can implement components of features of the network interface 150.

In many embodiments, the computer system 400 will further include a working memory 435, which can include a RAM or ROM device, as described herein. The computer system 400 also can include software elements, shown as currently being located within the working memory 435, including an operating system 440, device drivers, executable libraries, and/or other code, such as one or more application programs 445, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods. In some embodiments, the operating system 440 and the working memory 435 are used in conjunction with the one or more processors 410 to implement some or all of the media system 305, such as features of the delegate subsystem 310. For example, the operating system 440 and the working memory 435 are used in conjunction with the one or more processors 410 to implement some or all of the delegate proxy 320 and the stale variant detector 330.

A set of these instructions and/or codes can be stored on a non-transitory computer-readable storage medium, such as the non-transitory storage device(s) 425 described above. In some cases, the storage medium can be incorporated within a computer system, such as computer system 400. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 400 and/or can take the form of source and/or installable code, which, upon compilation and/or installation on the computer system 400 (e.g., using any of a variety of generally available compilers, installation programs, compression/decompression utilities, etc.), then takes the form of executable code.

In some embodiments, the computational system 400 implements a system for adaptive media playback of a live content stream, as described herein. The non-transitory storage device(s) 425 can have instructions stored thereon, which, when executed, cause the processor(s) 410 to mediate adaptive streaming of a live content stream to a media player client (e.g., which may also be implemented by the computational system 400, or may be implemented by a separate client-side environment). For example, executing the instructions can cause the processor(s) 410 to intercept a manifest update request for an update to a requested variant manifest that is presently directing sequential buffering of content segments of the live content stream; communicate the manifest update request to a remote content delivery node via a communication network; receive a manifest update response from the remote content delivery node via the communication network in response to the manifest update request (e.g., the manifest update response comprising a presumptively updated version of the requested variant manifest; detect a stale variant state by determining that the presumptively updated version of the requested variant manifest matches a previously received version of the requested variant manifest; and issue a failover trigger to the media player client in response to detecting the stale variant state (e.g., where the media player client is configured automatically to execute a failover routine in response to the failover trigger).

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which can be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 can cause the processor(s) 410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media can be involved in providing instructions/code to processor(s) 410 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 400.

The communications subsystem 430 (and/or components thereof) generally will receive signals, and the bus 405 then can carry the signals (and/or the data, instructions, etc., carried by the signals) to the working memory 435, from which the processor(s) 410 retrieves and executes the instructions. The instructions received by the working memory 435 may optionally be stored on a non-transitory storage device 425 either before or after execution by the processor(s) 410.

Figure 5:
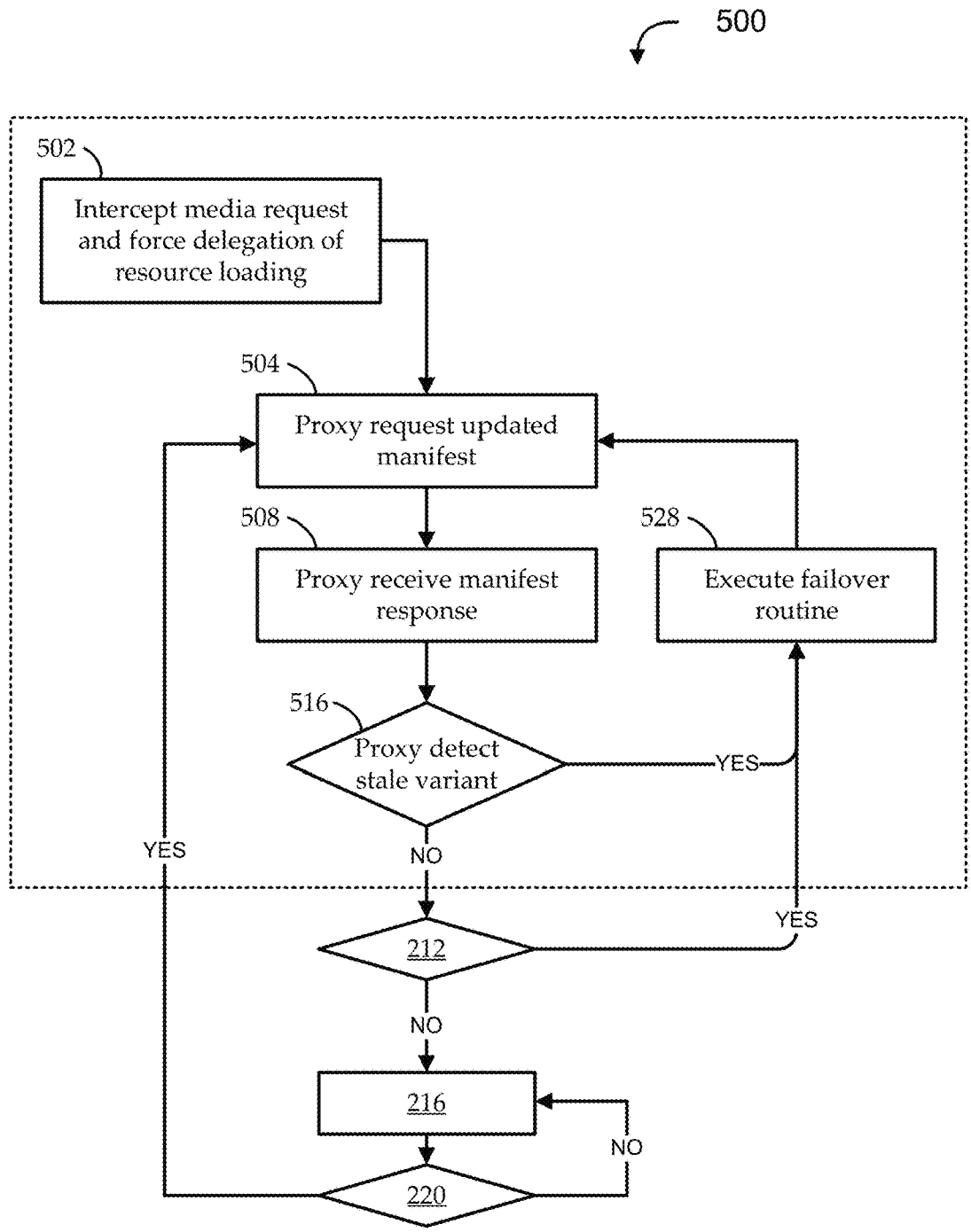
FIG. 5 shows a flow diagram of an illustrative method for live media streaming using a delegate subsystem, according to various embodiments.

Systems including those described above can be used to implement various methods. FIG. 5 shows a flow diagram of an illustrative method 500 for live media streaming using a delegate subsystem, according to various embodiments. The illustrated method is intended generally to provide an illustrative overview of a live media streaming transaction, such as where the media player client 110 iteratively and sequentially requests (e.g., via the request engine 130), retrieves (e.g., via the response engine 135), buffers (e.g., to a playback buffer 124 at the data stores 120), and plays back (e.g., via the player interface 115) content segments of requested media content. The buffering can be performed in a manner that maintains forward-data, so that a continuous stream can be maintained even with temporary fluctuations in connectivity, link quality, etc. The method can be triggered when a consumer (e.g., a human user) accesses features of the media player client 110 via the player interface 115 to request particular live media content for streaming from some network location. As noted above, the term "live" generally includes any type of stream for which streaming involves iteratively requesting and receiving manifest updates (e.g., including both live-type and event-type streams described above), such as where new content segments are being generated and encoded at the CDNs while streaming playback is occurring.

In some embodiments of the method 500, certain steps are performed by the delegate subsystem, and others are performed by the media player client 110. For example, stages 502-516 (within the dashed box) may be performed by the delegate subsystem, and other stages may be performed by the media player client. Some embodiments of the method 500 begin at stage 502 by intercepting the media request an forcing delegation of associated resource loading to the delegate subsystem (e.g., to the delegate proxy. Under such delegation, the delegate proxy handles certain request and response functions on behalf of the media player client, while also adding stale variant handling features. For example, as illustrated, at stage 504 the delegate proxy can request an update to a particular variant manifest from a particular CDN. The update can be received by the delegate proxy from the CDN at stage 508. The update can indicate what is presently available in the cache of the CDN for the requested stream variant associated with the variant manifest. Assuming the update is successful, the method 500 will ultimately proceed, at stage 216, to forward the updated variant manifest to the media player client, and the media client can retrieve one or more next content segments from the cache of the CDN according to the updated manifest. The retrieved content segments can be played back sequentially by the media player client 110. At stage 220, the media player client can monitor whether it is time for another update to the manifest (e.g., whether playback is approaching a minimum amount of forward-buffered content. If it is not time for an update, retrieval and/or playback of content segments can continue at stage 216. If it is time for an update to the manifest, the method can return to stage 504 for further manifest update requests.

As described herein, various conditions can lead to an unsuccessful manifest update. For example, at stage 516, embodiments can determine whether the response received in stage 508 indicates a stale variant condition, as described herein. If so, embodiments can direct execution of a failover routine at stage 528. For example, the delegate subsystem may issue a failover trigger to the media player client by appending a gap tag to the updated variant manifest, issuing a 404 error, or the like. Even if there is no stale variant detected at stage 516, a further determination may be made in some instances, at stage 212, as to whether the response includes or indicates an error tag, a change in link condition, or some other unsuccessful condition. If so, again, embodiments can direct execution of a failover routine at stage 528. Execution of the failover routine at stage 528 can cause the media player client to attempt a remedial action, such as by switching over to a different stream variant and/or a different CDN for the remainder (or at least a subsequent portion) of the streaming.

Figure 6A:
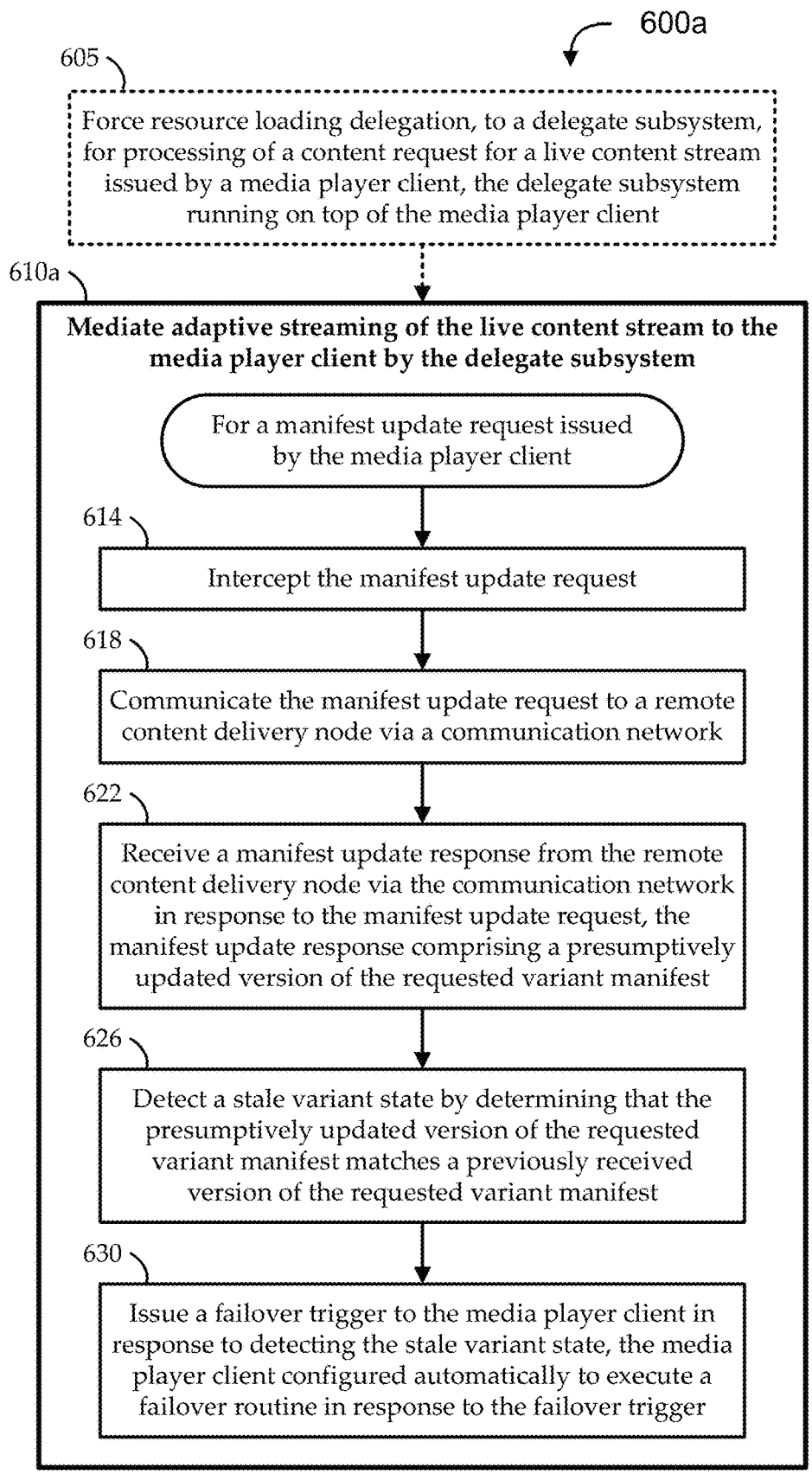
FIGS. 6A and 6B show flow diagrams of additional methods for adaptive media playback of a live content stream, according to various embodiments described herein.
Figure 6B:
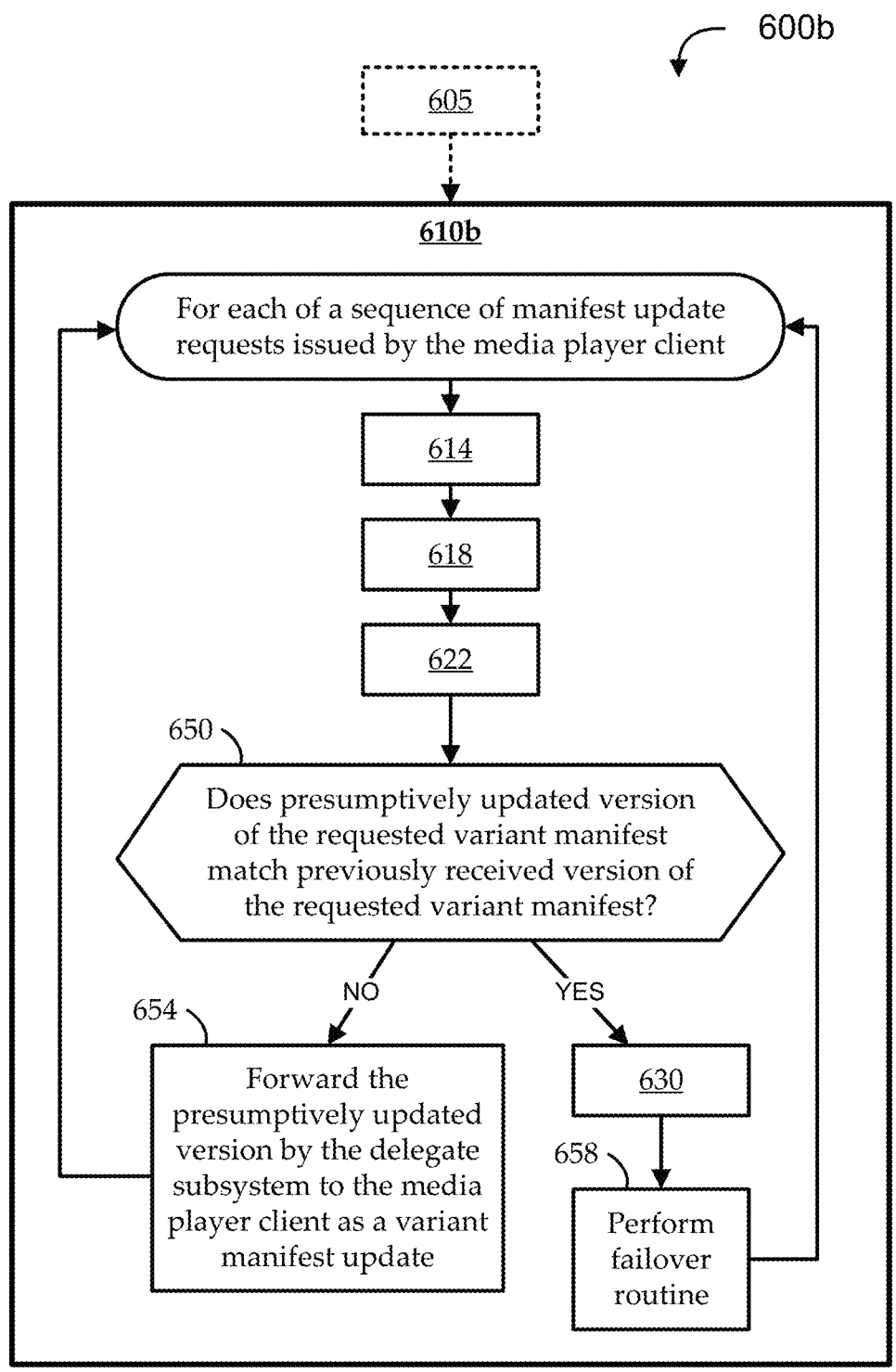

FIGS. 6A and 6B show flow diagrams of additional methods 600 for adaptive media playback of a live content stream, according to various embodiments described herein. Turning first to FIG. 6A, some embodiments of the method 600*a* begin with stage 605. At stage 605, embodiments can force resource loading delegation, to a delegate subsystem, for processing of a content request for the live content stream issued by the media player client. For example, forcing resource loading delegation can include: intercepting the content request by the delegate subsystem, the content request identifying a network address for the live content stream; and modifying the network address by the delegate subsystem to a custom address scheme to cause the media player client automatically to force the resource loading delegation to the delegate subsystem for the content request.

Some embodiments of the method begin at stage 610*a*, or continue at stage 610*a* after the delegation occurs in stage 605. At stage 610*a*, embodiments can mediate adaptive streaming of a live content stream to a media player client by a delegate subsystem running on top of the media player client. The mediating at stage 610*a* in FIG. 6A assumes that a stale variant condition is found for a particular manifest update request issued by the media player client, and includes performance of sub-stages 614-630. At sub-stage 614, embodiments can intercept the manifest update request by the delegate subsystem. The manifest update request can be for an update to a requested variant manifest that is presently directing sequential buffering of content segments of the live content stream. At sub-stage 618, embodiments can communicate the manifest update request by the delegate subsystem to a remote content delivery node via a communication network.

At sub-stage 622, embodiments can receive a manifest update response by the delegate subsystem from the remote content delivery node via the communication network in response to the manifest update request. The manifest update response can include a presumptively updated version of the requested variant manifest. At sub-stage 626, embodiments can detect, by the delegate subsystem, a stale variant state by determining that the presumptively updated version of the requested variant manifest matches a previously received version of the requested variant manifest. At sub-stage 630, embodiments can issue a failover trigger by the delegate subsystem to the media player client in response to detecting the stale variant state, the media player client configured automatically to execute a failover routine in response to the failover trigger.

Turning to FIG. 6B, a similar method 600*b* is illustrated, but the mediating at stage 610*b* is shown as an iterative process that may or may not detect a stale variant condition in each iteration. For example, the mediation of stage 610*b* include performance of the sub-stages of stage 610*a*, with some modifications and additions, for some or all manifest update requests of a sequence of manifest update requests issued by the media player client. For example, as in stage 610*a*, embodiments can intercept the manifest update request at sub-stage 614, communicate the manifest update request to a remote content delivery node via a communication network at sub-stage 618, and receive a manifest update response at sub-stage 622.

At sub-stage 650, embodiments can determine, by the delegate subsystem, whether the presumptively updated version of the requested variant manifest matches the previously received version of the requested variant manifest. If so, this can indicate a stale variant condition, as in FIG. 6A. For example, if so, the determination at sub-stage 650 essentially becomes the determination at sub-stage 626. In such a case, as in FIG. 6A, embodiments can issue a failover trigger at sub-stage 630. In some embodiments, as illustrated in FIG. 6B, a failover routine can be performed accordingly at sub-stage 658, and embodiments can continue to iterate under the failover conditions (e.g., using a new stream variant and/or a new CDN). If the determination at sub-stage 650 is that the presumptively updated version does not match the previously received version, embodiments can forward the presumptively updated version by the delegate subsystem to the media player client as a variant manifest update at sub-stage 654. Embodiments can continue to iterate for a next manifest update request.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An adaptive media player system comprising:
   a network interface to communicatively couple with one or more remote content delivery nodes (CDNs) via one or more access networks;
   a media player client subsystem configured for bitrate-adaptive streaming of a live content stream according to a streaming protocol that directs the bitrate-adaptive streaming using one or more manifests; and
   a delegate subsystem configured to mediate a sequence of manifest update requests issued by the media player client, the sequence of manifest update requests being for sequential updates to a requested variant manifest of the one or more manifests that is presently directing sequential buffering of content segments of the live content stream to effect the bitrate-adaptive streaming, the delegate subsystem having:
      a delegate proxy to intercept a manifest update request of the sequence of manifest update requests, communicate the manifest update request to a CDN of the one or more remote CDNs via the network interface, and receive a manifest update response from the CDN via the network interface in response to the manifest update request, the manifest update response comprising a presumptively updated version of the requested variant manifest; and
      a stale variant detector to detect a stale variant state by determining that the presumptively updated version of the requested variant manifest matches a previously received version of the requested variant manifest, and issue a failover trigger to the media player client in response to detecting the stale variant state,
   wherein the media player client is further configured automatically to execute a failover routine in response to the failover trigger.

2. The adaptive media player system of claim 1, wherein the delegate subsystem is further configured, in response to a content request for the live content stream being issued by the media player client, to force delegation of resource loading associated with the content request to the delegate proxy.

3. The adaptive media player system of claim 2, wherein the forcing delegation comprises:
   parsing the content request to determine a network address for the live content stream identified by the content request; and
   modifying the network address to a custom address scheme to cause the media player client automatically to delegate resource loading to the delegate proxy for the content request.

4. The adaptive media player system of claim 1, wherein the delegate proxy is further configured, for each manifest update request of the sequence of manifest update requests, to:
   determine whether the presumptively updated version of the requested variant manifest matches the previously received version of the requested variant manifest; and
   forward, responsive to determining that the presumptively updated version does not match the previously received version, the presumptively updated version by the delegate proxy to the media player client as a variant manifest update,
   wherein the stale variant detector is configured to detect the stale variant state and issue the failover trigger only responsive to the delegate proxy determining that the presumptively updated version matches the previously received version.

5. The adaptive media player system of claim 1, wherein the failover trigger comprises one of a Hypertext Transfer Protocol (HTTP) 404 error response code or a live streaming protocol gap tag.

6. The adaptive media player system of claim 1, further comprising:
   a data store having, stored thereon in connection with the live content stream, a master manifest, and a plurality of variant manifests identified by the master manifest and including the requested variant manifest,
   wherein the bitrate-adaptive streaming is at least partially in accordance with the master manifest, and
   wherein the media player client is configured automatically to execute the failover routine in response to the failover trigger and in accordance with the master manifest by automatically selecting a different variant manifest of the plurality of variant manifests for the live content stream to use for subsequent manifest update requests.

7. The adaptive media player system of claim 1, further comprising:
   a data store having, stored thereon in connection with the live content stream, a master manifest, and a plurality of variant manifests including the requested variant manifest, the master manifest identifying the plurality of variant manifests and a plurality of CDN addresses from which to request updates to the plurality of variant manifests, wherein the manifest update request indicates a present CDN address of the plurality of CDN addresses from which to receive the update to the requested variant manifest, and wherein the media player client is configured automatically to execute the failover routine in response to the failover trigger and in accordance with the master manifest by automatically selecting a different content delivery node address of the plurality of content delivery node addresses from which to request the update to the requested variant manifest in subsequent manifest update requests.

8. A method for adaptive media playback of a live content stream, the method comprising:

mediating adaptive streaming of a live content stream to a media player client by a delegate subsystem running on top of the media player client, the mediating comprising, for a manifest update request of a sequence of manifest update requests issued by the media player client:

intercepting the manifest update request by the delegate subsystem;

communicating the manifest update request by the delegate subsystem to a remote content delivery node via a communication network, the manifest update request being for an update to a requested variant manifest that is presently directing sequential buffering of content segments of the live content stream;

receiving a manifest update response by the delegate subsystem from the remote content delivery node via the communication network in response to the manifest update request, the manifest update response comprising a presumptively updated version of the requested variant manifest;

detecting, by the delegate subsystem, a stale variant state by determining that the presumptively updated version of the requested variant manifest matches a previously received version of the requested variant manifest; and issuing a failover trigger by the delegate subsystem to the media player client in response to detecting the stale variant state, the media player client configured automatically to execute a failover routine in response to the failover trigger.

9. The method of claim 8, further comprising:

forcing resource loading delegation, to the delegate subsystem, for processing of a content request for the live content stream issued by the media player client.

10. The method of claim 9, wherein the forcing resource loading delegation comprises:

intercepting the content request by the delegate subsystem, the content request identifying a network address for the live content stream; and modifying the network address by the delegate subsystem to a custom address scheme to cause the media player client automatically to force the resource loading delegation to the delegate subsystem for the content request.

11. The method of claim 8, wherein the mediating is performed iteratively to further comprise, for each manifest update request of the sequence of manifest update requests:

determining, by the delegate subsystem, whether the presumptively updated version of the requested variant manifest matches the previously received version of the requested variant manifest; and responsive to determining that the presumptively updated version does not match the previously received version, forwarding the presumptively updated version by the delegate subsystem to the media player client as a variant manifest update, wherein the detecting the stale variant state and the issuing the failover trigger are only performed responsive to determining that the presumptively updated version matches the previously received version.

12. The method of claim 8, wherein the issuing the failover trigger comprises issuing a response by the delegate subsystem to the media player client that comprises one of a Hypertext Transfer Protocol (HTTP) 404 error response code or a live streaming protocol gap tag.

13. The method of claim 8, wherein:

the adaptive streaming by the media player client is at least partially in accordance with a master manifest associated with the live content stream, the master manifest identifying a plurality of variant manifests for the live content stream including the requested variant manifest; and the media player client is configured automatically to execute the failover routine in response to the failover trigger and in accordance with the master manifest by automatically selecting a different variant manifest of the plurality of variant manifests for the live content stream to use for subsequent manifest update requests.

14. The method of claim 8, wherein:

the manifest update request indicates a present content delivery node address from which to receive the update to the requested variant manifest;

the adaptive streaming by the media player client is at least partially in accordance with a master manifest associated with the live content stream, the master manifest identifying a plurality of content delivery node addresses from which to request the update to the requested variant manifest, the plurality of content delivery node addresses comprising the present content delivery node address; and the media player client is configured automatically to execute the failover routine in response to the failover trigger and in accordance with the master manifest by automatically selecting a different content delivery node address of the plurality of content delivery node addresses from which to request the update to the requested variant manifest in subsequent manifest update requests.

15. A system for adaptive media playback of a live content stream, the system comprising:

one or more processors;

non-transient memory having instructions stored thereon, which, when executed, cause the one or more processors to mediate adaptive streaming of a live content stream to a media player client, the mediating comprising, for a manifest update request of a sequence of manifest update requests issued by the media player client:

intercepting the manifest update request by the delegate subsystem;

communicating the manifest update request by the delegate subsystem to a remote content delivery node via a communication network, the manifest update request being for an update to a requested variant manifest that is presently directing sequential buffering of content segments of the live content stream;

receiving a manifest update response by the delegate subsystem from the remote content delivery node via the communication network in response to the manifest update request, the manifest update response comprising a presumptively updated version of the requested variant manifest;

detecting, by the delegate subsystem, a stale variant state by determining that the presumptively updated version of the requested variant manifest matches a previously received version of the requested variant manifest; and issuing a failover trigger by the delegate subsystem to the media player client in response to detecting the stale variant state, the media player client configured automatically to execute a failover routine in response to the failover trigger.

16. The system of claim 15, wherein the instructions, when executed, cause the one or more processors further to force delegation of resource loading associated with the mediating in response to a content request for the live content stream issued by the media player client.

17. The system of claim 16, wherein the forcing delegation comprises:

intercepting and the content request to identify a network address for the live content stream; and modifying the network address to a custom address scheme to cause the media player client automatically to delegate the resource loading for the content request.

18. The system of claim 15, wherein the mediating is performed iteratively to further comprise, for each manifest update request of the sequence of manifest update requests:

determining whether the presumptively updated version of the requested variant manifest matches the previously received version of the requested variant manifest; and forwarding the presumptively updated version to the media player client as a variant manifest update responsive to determining that the presumptively updated version does not match the previously received version, wherein the detecting the stale variant state and the issuing the failover trigger are only performed responsive to determining that the presumptively updated version matches the previously received version.

19. The system of claim 15, wherein:

the non-transient memory further has, stored thereon in connection with the live content stream, a master manifest, and a plurality of variant manifests identified by the master manifest and including the requested variant manifest, wherein the adaptive streaming is at least partially in accordance with the master manifest, and wherein the media player client is configured automatically to execute the failover routine in response to the failover trigger and in accordance with the master manifest by automatically selecting a different variant manifest of the plurality of variant manifests for the live content stream to use for subsequent manifest update requests.

20. The system of claim 15, wherein:

the non-transient memory further has, stored thereon in connection with the live content stream, a master manifest, and a plurality of variant manifests including the requested variant manifest, the master manifest identifying the plurality of variant manifests and a plurality of CDN addresses from which to request updates to the plurality of variant manifests, wherein the manifest update request indicates a present CDN address of the plurality of CDN addresses from which to receive the update to the requested variant manifest, and wherein the media player client is configured automatically to execute the failover routine in response to the failover trigger and in accordance with the master manifest by automatically selecting a different content delivery node address of the plurality of content delivery node addresses from which to request the update to the requested variant manifest in subsequent manifest update requests.

* * * * *